(12) United States Patent
Wang

(10) Patent No.: US 8,574,108 B2
(45) Date of Patent: Nov. 5, 2013

(54) SPROCKETS MADE OF TWO MATERIALS WITH HALF HOLES ON THE EDGE OF CENTRAL PORTION

(75) Inventor: Yimin Wang, Ningbo (CN)

(73) Assignee: Vpower Racing USA, Inc., Ningbo (CN)

( * ) Notice: Subject to any disclaimer, the term of this patent is extended or adjusted under 35 U.S.C. 154(b) by 105 days.

(21) Appl. No.: 12/819,917

(22) Filed: Jun. 21, 2010

(65) Prior Publication Data

US 2011/0312457 A1 Dec. 22, 2011

(51) Int. Cl.
*F16H 55/30* (2006.01)

(52) U.S. Cl.
USPC .......................................... 474/152

(58) Field of Classification Search
USPC ................................. 474/152–163
See application file for complete search history.

(56) References Cited

U.S. PATENT DOCUMENTS

| 969,237 | A | 9/1910 | Woolnough et al. | |
|---|---|---|---|---|
| 1,115,557 | A | 11/1914 | Livermore | |
| 3,069,922 | A * | 12/1962 | Harvey | 474/162 |
| 3,168,836 | A * | 2/1965 | Militana | 474/152 |
| 3,439,551 | A * | 4/1969 | Militana | 474/162 |
| 4,798,565 | A * | 1/1989 | Boyd | 474/158 |
| 7,481,729 | B2 | 1/2009 | Andel | |
| 7,967,709 | B2 * | 6/2011 | Emura et al. | 474/161 |
| 2003/0199351 | A1 * | 10/2003 | Nichols | 474/160 |
| 2004/0092352 | A1 * | 5/2004 | Chiang | 474/160 |
| 2005/0272546 | A1 | 12/2005 | Reiter | |
| 2007/0270260 | A1 * | 11/2007 | Latham | 474/152 |

FOREIGN PATENT DOCUMENTS

| CN | 201434059 Y | * | 3/2010 | ............. F16H 55/30 |
|---|---|---|---|---|
| EP | 2397724 A1 | * | 12/2011 | ............. F16H 55/30 |

* cited by examiner

*Primary Examiner* — William E Dondero
*Assistant Examiner* — Minh Truong
(74) *Attorney, Agent, or Firm* — Orrick, Herrington & Sutcliffe LLP

(57) ABSTRACT

The present sprocket wheel invention enhances the efficiency of the sprockets made of two materials, e.g., a lighter material at central portion of the sprocket and a hard material at peripheral portion of the sprocket comprising teeth, by drilling half holes on the outer edge of the central portion and half holes on the inner edge of the peripheral portion of the sprocket. In the preferred embodiment, half of the thickness of the sprocket is the entire hole on the peripheral portion of the sprocket with harder materials, and the other half of the thickness of the sprocket is designed to have said half holes for rivets to attach the central portion and the peripheral portion of the sprocket.

12 Claims, 3 Drawing Sheets

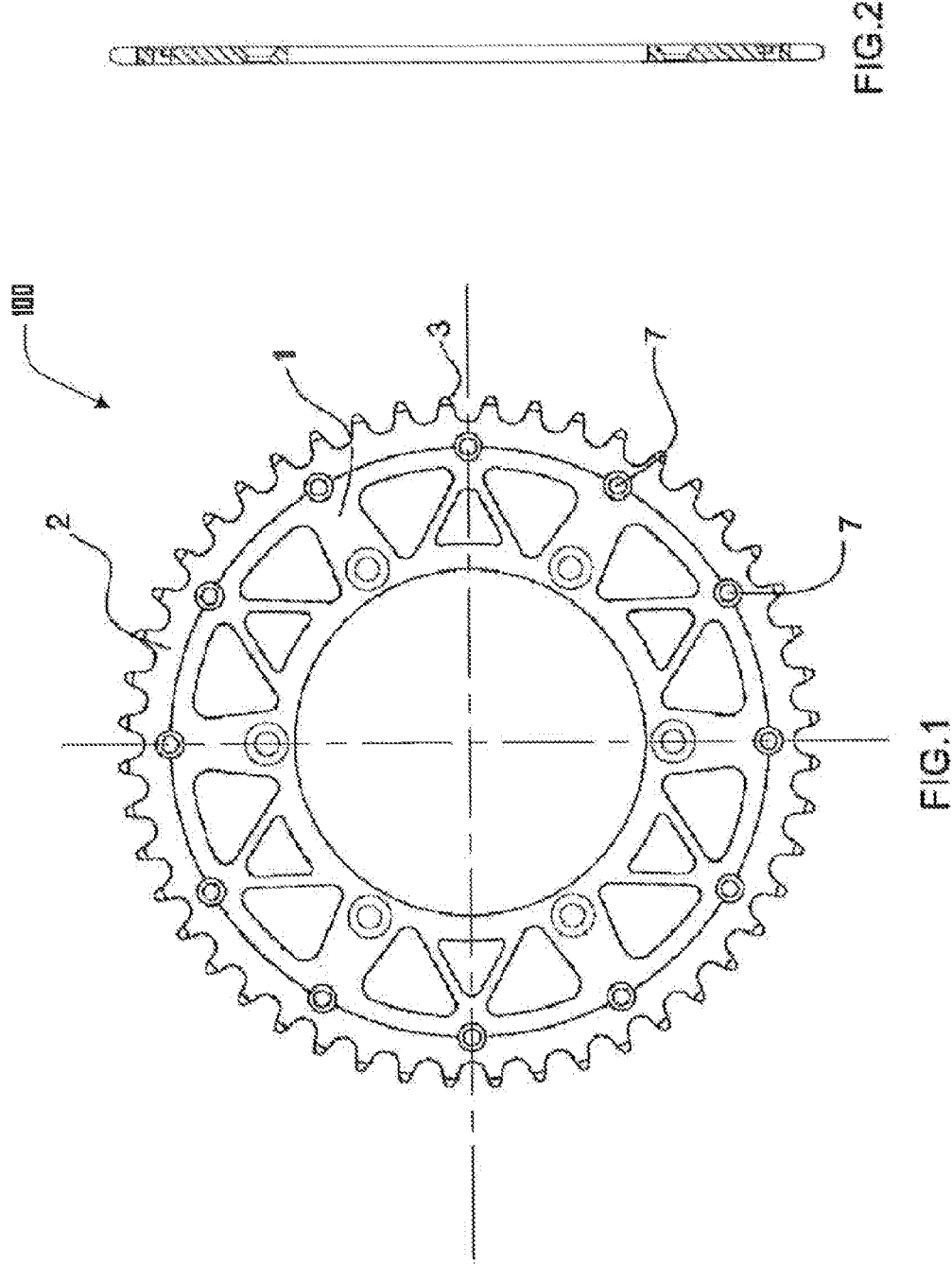

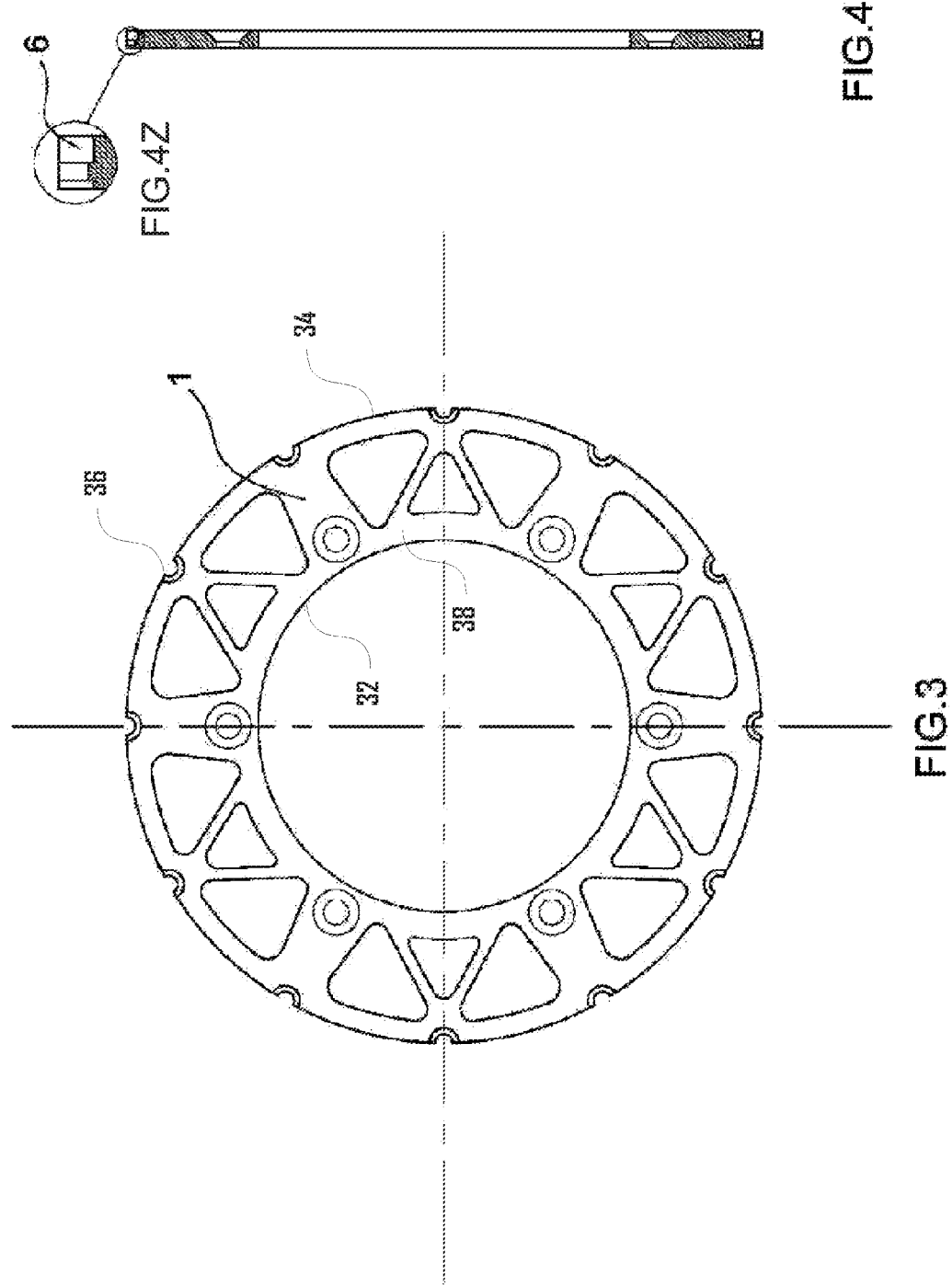

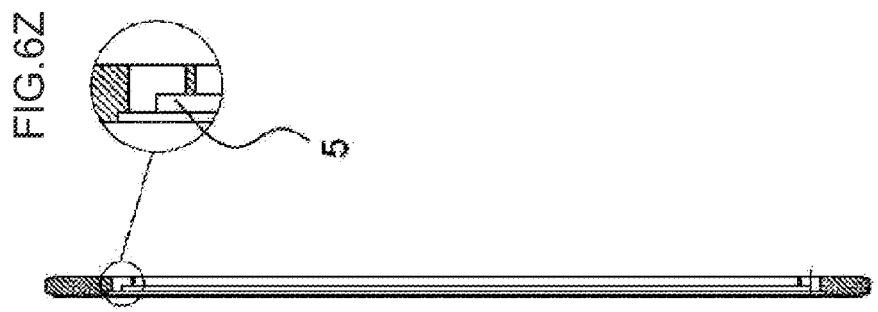
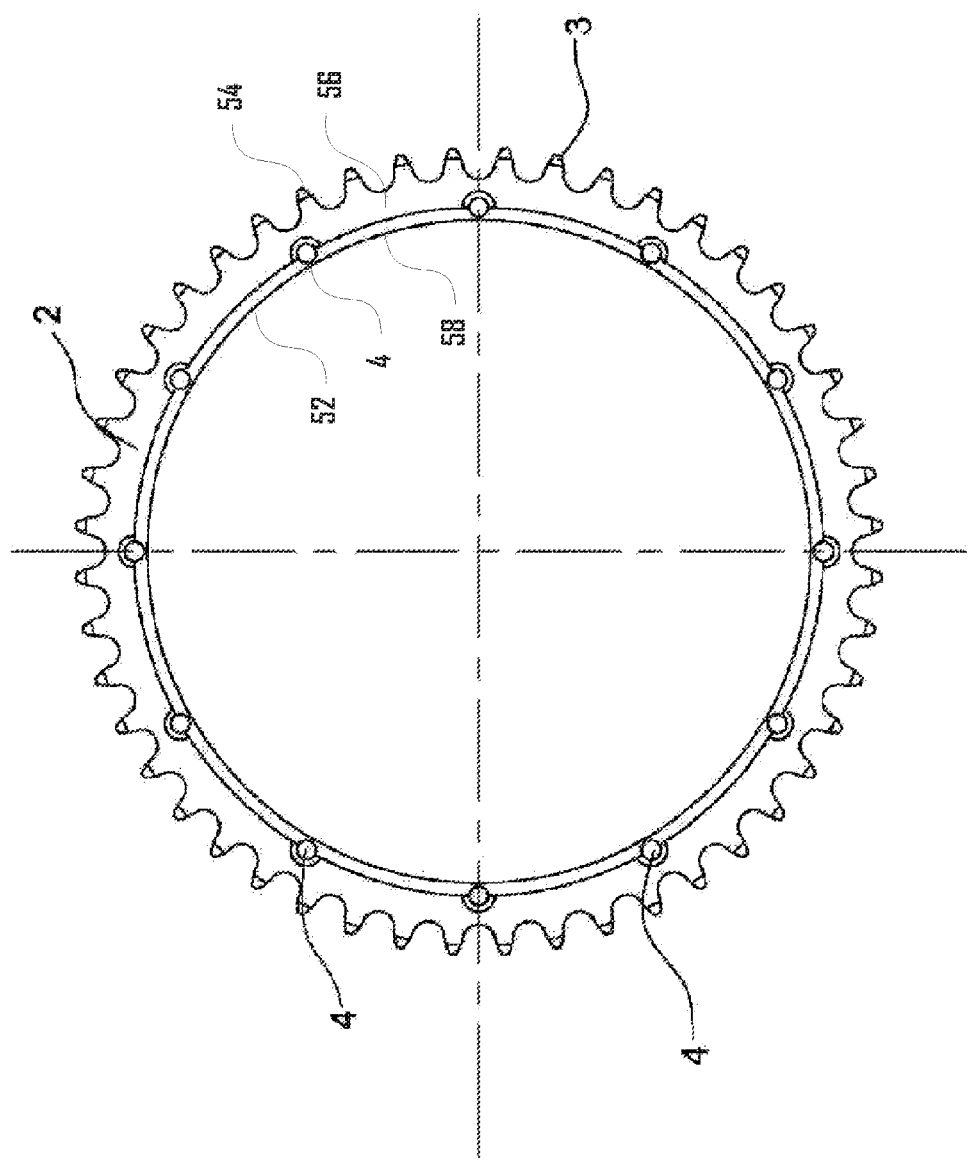

SPROCKETS MADE OF TWO MATERIALS WITH HALF HOLES ON THE EDGE OF CENTRAL PORTION

FIELD OF THE INVENTION

The invention relates to sprocket wheels, especially for those intended for outside use in power transmission of motor vehicles.

BACKGROUND OF THE INVENTION

Power transmissions by chains are widely used in various vehicles, e.g., bicycles and motorcycle. The sprockets in these chain-transmissions transmit the torque from the axels to the chain by the sprocket teeth. For high performance sprockets, two requirements are important. (i) The sprockets must sustain high torque. (ii) The sprockets must be lightweight, for the weight in vehicle would increase the burden on other part of the vehicle, e.g., the engine and the sprocket teeth.

It is not a new idea to use two different materials for the central portion and the peripheral portion of the sprockets, so that lightweight but relatively soft materials can be used at the central portion of the sprockets and harder but heavier materials can be used at the peripheral portion comprising teeth. U.S. Pat. No. 969,237, which was patented in 1910, is one of the examples.

The basic design, which is composed of a central portion and a peripheral portion comprising teeth is widely used. See also U.S. Publication No.: US 2005/0272546.

In certain applications of the two-material design, e.g., U.S. Pat. No. 7,481,729, as well as U.S. Pat. No. 969,237, the peripheral portion's perforated inward extensions, i.e., the toothed portion, that overlap with the central portion with corresponding recesses and holes, act as connection between the central portion and the peripheral portion of the sprocket. That design creates (i) the weak point in the design, i.e., the necks of the extensions, and (ii) the compromise between the strength of the connection and the weight, i.e., the increased number of extensions increases the connective strength but also increases the weight of the sprocket, while the decreased number of extensions increases the force on each extension and thereby increases the metal fatigue at the necks of the extensions.

As the weight of the material increases proportional to the square of the diameter, the thickness of the peripheral portion, i.e., the portion of the diameter that is occupied by the peripheral portion, which is at the outer limit of the sprocket, is critically related to the weight of the overall sprocket. A slight increase in the thickness of the peripheral portion would increase the weight of the entire sprocket significantly.

SUMMARY OF THE INVENTION

The present invention is used in the design of sprocket by using two materials, a lighter material for the central portion and a harder material for the peripheral portion. By providing a novel means to attach the central portion of a sprocket to the peripheral portion, the invention allows the increased area of the central portion of the sprocket, and eliminates the weak points in the traditional design, i.e., the neck of the extensions for the purpose of joining the two portions. In one of the embodiments, the connecting holes are drilled on the peripheral portion of the sprocket, with half holes drilled on the outer edge of the central portion of the sprocket matching the half holes drilled on the inner edge of the peripheral portion of the sprocket. This design eliminated the necessity of an extension from the peripheral portion to overlap with the central portion, so rivets could be applied to join the central portion and the peripheral portion of the sprocket, and thereby allow a flexible number of holes, i.e., rivets, to join the central portion and the peripheral portion of the sprocket at expected strengthened.

BRIEF DESCRIPTION OF THE DRAWINGS

FIG. 1 is a plan view of the sprocket, when assembled, according the present invention.

FIG. 2 is a cross-section view of the sprocket from FIG. 1, when both portions are joined together by rivets.

FIG. 3 is a plan view of the central portion of the sprocket, according the present invention.

FIG. 4 is a cross-section view of the central portion from FIG. 3.

FIG. 4Z is a zoomed-in view portion of FIG. 4.

FIG. 5 is a plan view of the rim portion of the sprocket, according to the present invention.

FIG. 6 is a cross-section view of the peripheral portion from FIG. 5.

FIG. 6Z is a zoomed-in view portion of FIG. 6.

DETAILED DESCRIPTION OF THE INVENTION

In the present disclosure, in an embodiment, a sprocket 100 may be made of two parts, i.e., a central portion 1 and a peripheral portion 2. The central portion 1 may be connected to an axel (not shown) and the peripheral portion 2 may comprise teeth 3. FIGS. 1 and 2 depict the central portion 1 and peripheral portion 2 coupled and FIGS. 3-4 and 5-6 depict the central portion 1 and peripheral portion 2 respectively. As depicted in FIGS. 3 and 4, the central portion 1 may be substantially planar and circular and comprise a central-portion body 38. The central portion 1 may further comprise a central-portion inner and outer edge 32, 34. The central-portion outer edge 34 may define a plurality of central-portion coupling slots 36 (or half-holes). In an embodiment, the central-portion coupling slots 36 may be open crescent shaped and correspond to a portion of the peripheral portion 2 as described herein. The central-portion outer edge 34 further comprises a central-portion rim 6, which may correspond to a portion of the peripheral portion 2 as described herein. The central-portion rim 6 may have a thickness that is less than the thickness of the central-portion body 38.

As depicted in FIGS. 5 and 6, the peripheral portion 2 may be substantially planar and circular, defining a peripheral-portion inner edge and peripheral-portion outer edge 52, 54 and a peripheral-portion body 56 and a peripheral-portion rim 58. The peripheral-portion outer edge 54 may define a plurality of teeth 3. The peripheral-portion rim 58 may define a portion of a coupling region 5, and may define the peripheral-portion inner edge 52 that may have a thickness that is less than the thickness of the peripheral-portion body 56. The peripheral-portion inner edge 52 may correspond to a portion of the central portion 1 as described herein.

The peripheral portion 2 may further define a plurality of peripheral-portion coupling orifices 4. The peripheral-portion coupling orifices 4 may be circular and have portions with two thicknesses. For example, as depicted in FIGS. 5 and 6, a peripheral-portion coupling orifices 4 may be defined by a portion of the peripheral-portion inner edge 52 and a portion of the peripheral-portion body 56.

As depicted in FIGS. 1 and 2, the central portion 1 and peripheral portion 2 may couple, wherein the peripheral portion 2 is peripheral to the central portion 1, with the peripheral-portion inner edge 52 abutting the central-portion outer edge 34. In an embodiment, the central-portion body 38 and peripheral-portion body 56 may have substantially the same thickness. The combined thickness of the peripheral-portion inner edge 52 and central-portion rim 6 may be substantially equal to the thickness of the central-portion body 38 and peripheral-portion body 56. Accordingly, when coupled, the central portion 1 and peripheral portion 2 may define a substantially planar sprocket 100 with a substantially uniform thickness.

In an embodiment, as depicted in FIGS. 1 and 2, the coupling orifices 4 and coupling slots 36 may correspond and collectively define a plurality of sprocket coupling holes 7. For example, the contour of a coupling orifice 4 may correspond to the circumference contour of a coupling slot 36 such that when coupled, the resulting coupling hole 7 may have uniform and contiguous circumference.

The central and peripheral portions 1, 2 may be joined by rivets. (See FIG. 1.) FIG. 2 is the cross-sectional view.

In one embodiment, coupling orifices 4 are drilled on the inner side of the peripheral portion 2. (See FIG. 5.) Material of half of the thickness on the inner side 5 of the peripheral portion 2 was removed so that on said half of the thickness, only halves of the holes remain. (See FIG. 6.) On the outer side 34 of the central portion 1, half of the thickness on the central-portion rim 6 of the central portion was removed so that the diameter matches that of the uncut diameter of the peripheral portion 2. The diameter of the uncut half of the thickness of the central portion matches the cut half of the thickness of the peripheral portion 2 of the sprocket 100, with half holes 36 drilled on the outer rim 34 of the uncut half of the thickness of the central portion 1 to match the half holes 4 on the peripheral portion. (See FIGS. 3 and 4.)

Rivets through the coupling holes 7 may be used to join the central portion 1 and the peripheral portion 1 of the sprockets. (See FIGS. 1 and 2.)

What is claimed:

1. A sprocket comprising
 a central portion comprising:
  a central-portion body having a first thickness;
  a central-portion outer edge defined in part by a central-portion rim extending from the central-portion body having a second thickness that is less than the first thickness; and,
  a plurality of central-portion half-hole coupling slots defined by the central portion rim and positioned at an outermost edge of the central-portion body and on a peripheral face facing radially and extending the entire thickness of the peripheral face; and
 a peripheral portion comprising:
  a peripheral-portion body having a thickness substantially the same as the first thickness;
  a peripheral-portion inner edge defined in part by a peripheral-portion rim extending from the central-portion body having a third thickness that is less than the first thickness; and,
  a plurality of peripheral-portion coupling orifices each having a portion defined by both the peripheral-portion body and a portion defined by the peripheral-portion rim, and
 wherein the central portion and peripheral portion are configured to couple, with the peripheral portion being peripheral to the central portion, with the peripheral-portion rim abutting the central-portion rim, and with the plurality of central-portion half-hole coupling slots corresponding to the peripheral-portion coupling orifices and defining a plurality of sprocket coupling holes.

2. The sprocket of claim 1 wherein the coupled central portion and peripheral portion define a substantially circular and planar sprocket body with a thickness substantially equal to the first thickness.

3. The sprocket of claim 1 wherein the second and third thickness combined is substantially equal to the first thickness.

4. The sprocket of claim 1, wherein the each of the plurality of sprocket coupling holes have a uniform and contiguous circumference.

5. The sprocket of claim 1, wherein the each of the plurality of sprocket coupling holes are defined by a portion of the peripheral portion having a thickness substantially equal to the first thickness.

6. The sprocket of claim 1, wherein the plurality of central-portion coupling slots are open crescent shaped.

7. The sprocket of claim 1 wherein the plurality of peripheral-portion coupling orifices each have a portion defined by both the peripheral-portion body having a thickness about equal to the first thickness, and a portion defined by the peripheral-portion rim about equal to the third thickness.

8. The sprocket of claim 1 wherein the plurality of peripheral-portion coupling orifices are each defined by a portion of the peripheral portion having two different thicknesses.

9. The sprocket of claim 1 wherein the plurality of peripheral-portion coupling orifices are each defined by a portion of the peripheral portion that defines a ledge.

10. The sprocket of claim 1 wherein the plurality of central-portion coupling slots define slots without defining a contiguous hole.

11. The sprocket of claim 1 wherein each of the sprocket coupling holes is defined by:
 a first portion of a peripheral-portion coupling orifice substantially equal to the first thickness;
 a second portion of a peripheral-portion coupling orifice substantially equal to the second thickness; and
 a portion of a half-hole coupling slot corresponding to the second portion of a peripheral-portion coupling orifice.

12. The sprocket of claim 1 wherein each of the sprocket coupling holes is defined by:
 a first portion of a peripheral-portion coupling orifice substantially equal to the first thickness; and
 a second portion of a peripheral-portion coupling orifice substantially equal to the second thickness.

* * * * *